Nov. 8, 1927.  1,648,864
J. V. PUGH
WHEEL BRAKE FOR VEHICLES
Filed Oct. 15, 1926  3 Sheets-Sheet 1
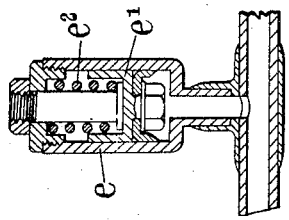
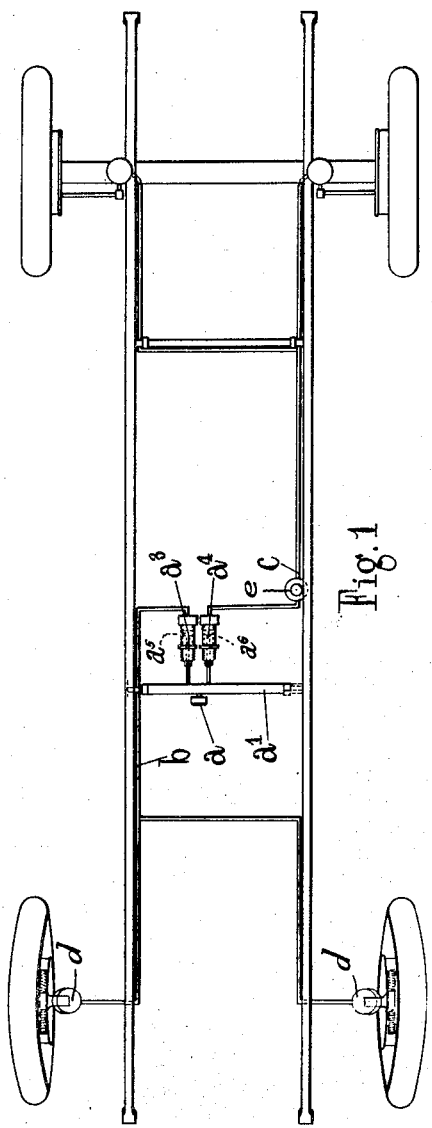
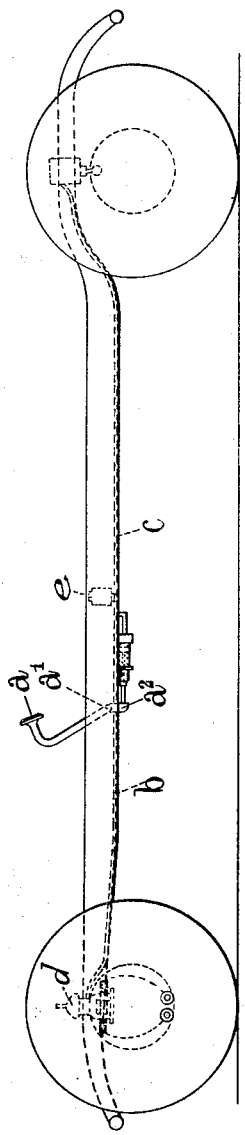

Nov. 8, 1927. 1,648,864
J. V. PUGH
WHEEL BRAKE FOR VEHICLES
Filed Oct. 15, 1926   3 Sheets-Sheet 2
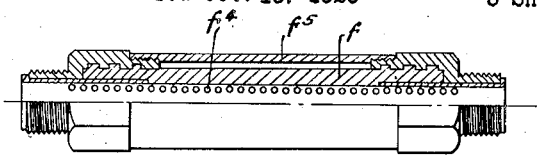
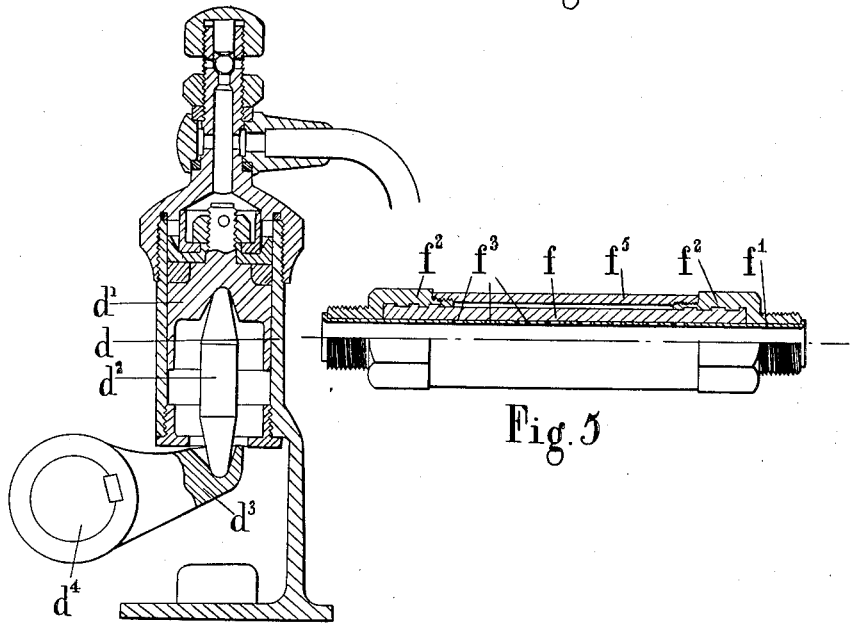
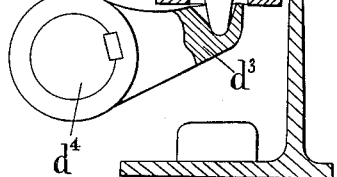
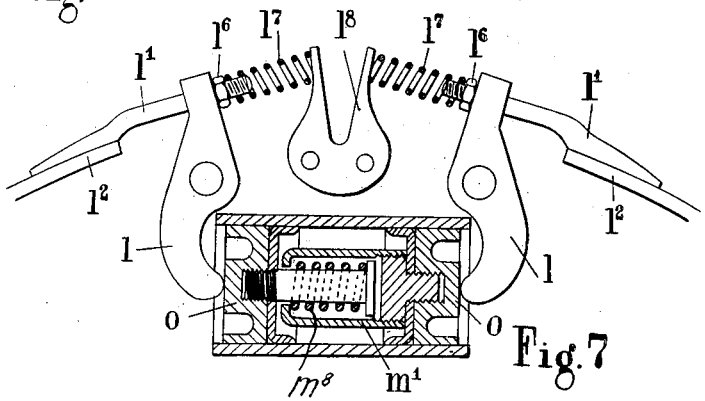

Nov. 8, 1927.

J. V. PUGH 1,648,864

WHEEL BRAKE FOR VEHICLES

Filed Oct. 15, 1926     3 Sheets-Sheet 3

J. V. Pugh
Inventor
By Marks & Clerk
Attys.

Patented Nov. 8, 1927.

1,648,864

UNITED STATES PATENT OFFICE.

JOHN VERNON PUGH, OF COVENTRY, ENGLAND, ASSIGNOR TO RUDGE-WHITWORTH, LIMITED, OF COVENTRY, ENGLAND.

WHEEL BRAKE FOR VEHICLES.

Application filed October 15, 1926, Serial No. 141,826, and in Great Britain October 13, 1925.

This invention relates to braking gear for vehicle wheel brakes at the fore and aft or front and rear ends of a vehicle, the transmission system being of the kind having means located somewhere between the region of application of power to the system and the application of gripping forces to the wheels so that the apportionment of force between the wheels at opposite ends may be varied in a manner depending upon the total power which is being applied or the distance which has been moved by the pedal or other member at the region where power is in the first instance applied to the system.

The object of the present invention is to provide improved transmission systems adapted to facilitate the apportionment of the gripping forces among the wheels of a vehicle.

The invention consists in a method of transmitting force from a power application member to wheel braking devices at both ends of a vehicle according to which a fluid column, such as the known expedient of a hydraulic piping system, is employed with force-apportioning means as the transmitting agent.

The invention further consists in a method as indicated or apparatus for operating in accordance therewith wherein the member to which power is applied operates pressure plungers connected by independent piping systems to pistons which actuate brake devices at the opposite ends of the vehicle and one of said systems is provided with a variable capacity resiliently loaded chamber for controlling the gripping force of the brakes at that end of the vehicle.

The invention further consists in a method or apparatus for transmitting force as indicated in which a plunger operated by a pedal or other power application member exerts pressure upon a piping system connected to pistons which actuate devices at opposite ends of a vehicle, and means responsive to pressure increase or movement of a plunger, piston or other part are adapted to mitigate or neutralize the force exerted upon the brake-applying elements at one end of the vehicle.

The invention further consists in a vehicle wheel brake-applying gear with fluid column actuation means in which a resilient transmitting device is inserted between a fluid-actuated element and the brake drum gripping device.

The invention also consists in improvements in or relating to wheel brakes for vehicles as hereinafter described.

Referring now to the accompanying drawings which show by way of example some ways of carrying the invention into effect:—

Figures 1 and 2 show in plan and side elevation a chassis fitted with brakes in accordance with the invention;

Figure 3 is a detail of a resiliently loaded chamber for one form of the invention;

Figures 4 and 5 are details of other forms of variable capacity devices;

Figure 6 is a section on the axis of a single-ended cylinder suitable for applying the brake by means of a torque shaft;

Figure 7 is also a section on the axis of a double-ended cylinder acting on a tension brake of which the ends only are shown;

Figure 8:
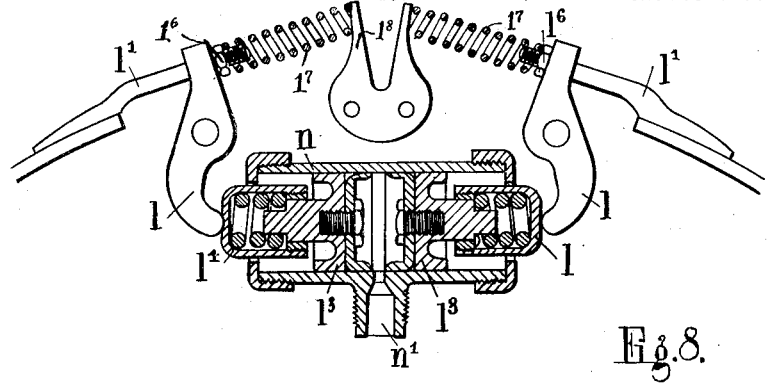
Figure 8 is another section on the axis of a double-ended cylinder suitable for applying a tension brake.

When applying brakes to the wheels at both ends of a vehicle, it is desirable to apportion the gripping force in such a manner that it does not at either end exceed the amount which may be usefully employed in view of the retarding effect that the particular wheels can exert on the vehicle owing to the pressure which they apply to the road surface, and this will depend upon the deceleration which is applied to the vehicle and to the distribution of its total weight among the various wheels and the height of the center of gravity above the wheel base. Generally speaking the retarding effect of the front wheels increases when the total power applied to the pedal or other force-application member is increased.

In the present application, the invention covers the actuation from the same pedal or force-application member of two plungers with separate piping or fluid column systems one for the front wheels and one for the back wheels so that the apportionment may be varied by varying the conditions in the two systems. In another application 176,149 filed March 17, 1927, divided from the present case there is described the use of a common piping or fluid column system and means coacting with the fluid-operated pistons to vary the gripping force at the opposite ends of the vehicle.

In carrying the invention into effect in the convenient constructions shown by way of example in Figures 1, 2 and 3, 4 or 5, the pedal $a$ to which the braking power is applied operates by the shaft $a'$ and arms $a^2$ two pressure plungers $a^5$, $a^6$ in the cylinders $a^3$, $a^4$ of which $a^3$ is connected by a hydraulic pipe system $b$ to the brake devices for the front wheels and $a^4$ is connected by a like system $c$ to the brake devices for the back wheels.

For the front wheels the fluid column will merely operate pistons which apply the brake devices in any ordinary known way as, for example, as shown in Figure 6, by a piston $d'$ in a cylinder $d$ moving by means of a strut $d^2$ the free end of a lever arm $d^3$ upon a torque shaft $d^4$ which applies a brake in any known or convenient way.

The fluid column connection and pistons for the back or non-steering wheels may be of a similar nature but in the system $c$ (Figures 1 and 2) there is provided a variable capacity resiliently loaded chamber, say in the form of a cylinder $e$ as shown in detail in Figure 3 having a piston $e'$ fitted thereto, which is held at its inward extremity by a coiled spring $e^2$ or alternatively by elastic fluid pressure or other resilient means.

By the spring $e^2$ or other resilient means any desired initial load may be placed upon the piston $e'$ with the result that for light pressure upon the pedal or the like the front brakes and back brakes will be subjected to a similar gripping action following a straight line diagram until the fluid pressure is sufficient for the capacity of the chamber $e$ in the system $c$ to the back wheels to be increased and from this point the gripping force on the back wheels will be increased very little, if at all, while that on the front wheels will go on increasing in substantially the same ratio as before.

When carrying the invention into effect as shown in Figures 4 and 5, the variable capacity resiliently loaded chamber may take the form of an elastic tube which may be conveniently constructed of a length of rubber tube $f$ stretched as in Figure 5 over a length of rigid tubing $f^1$ somewhat larger than the internal diameter of the rubber tube and gripped tightly thereto at each end by the caps $f^2$.

A series of perforations $f^3$ are provided in the rigid tube $f'$ which are kept closed by the external stressed rubber tube $f$ until a certain pressure has been reached, when the rubber tube will expand and afford capacity in the system $c$ connected to the back wheels. As the rubber tube expands it will present a larger diameter to the internal pressure so that a lower pressure than the first will be capable of retaining it in its extended position when the larger diameter is reached. In this way the gripping action upon the back wheels may be caused to decrease after a certain maximum has been attained, while the gripping force upon the front wheels will continue to increase throughout the range of brake action.

In Figure 4 a coiled wire $f^4$ is used instead of a perforated tube and in any such devices it is desirable to protect the resilient rubber tube with an external rigid tube or envelope $f^5$ so that expansion beyond a certain point may be prevented.

Figure 10:
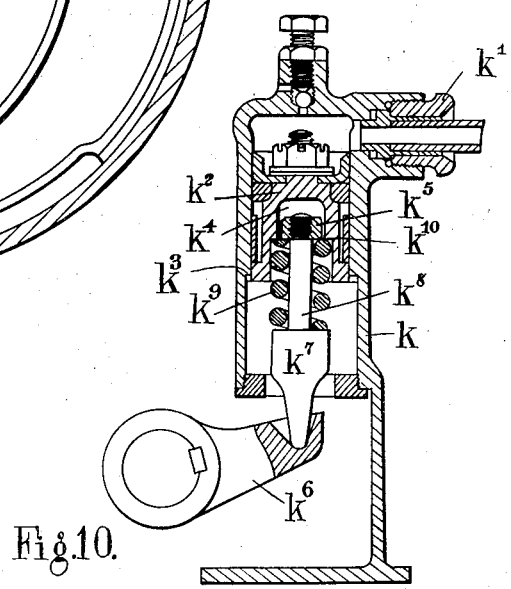
Figure 10 is a view similar to Figure 6 with a resilient transmission member.

Instead of resilient devices such as shown in Figures 3, 4 and 5 for increasing the capacity of the fluid-transmitting column to the back wheels a resilient transmission member such as a coiled spring may be inserted between a piston such as $k^2$ in Figure 10 and an arm such as $k^6$ for applying the back wheel brakes.

In such a device the cylinder $k$ as shown in Figure 10 is provided at the end to which the pipe connection $k'$ is attached with a piston $k^2$ having suitable cup leather and packing devices and to transmit the movement of the piston $k^2$ to the end of the brake lever a shouldered strut $k^7$, $k^8$ is provided, the outer and larger diameter end $k^7$ of which presses upon the end of the lever $k^6$, while the inner and smaller diameter end $k^8$ is provided with a screwed collar $k^5$ at its extremity which is an easy sliding fit in a cavity $k^4$ formed in the piston $k^2$. A coiled spring $k^9$ surrounds the small end $k^8$ of the strut, abutting at its outer end against the shoulder of the enlarged end $k^7$ and at its inner end against the collar $k^5$ screwed upon the extremity of the strut. By means of this collar any desired initial stress may be put upon the spring $k^9$. The inner end of this spring $k^9$ in addition abuts against a step $k^{10}$ in the cavity $k^4$ in the piston so that the movement of the piston $k^2$ is transmitted to the end of the brake band through the resilient member formed by the coiled spring $k^9$ upon the strut $k^7$, $k^8$.

Figure 9:
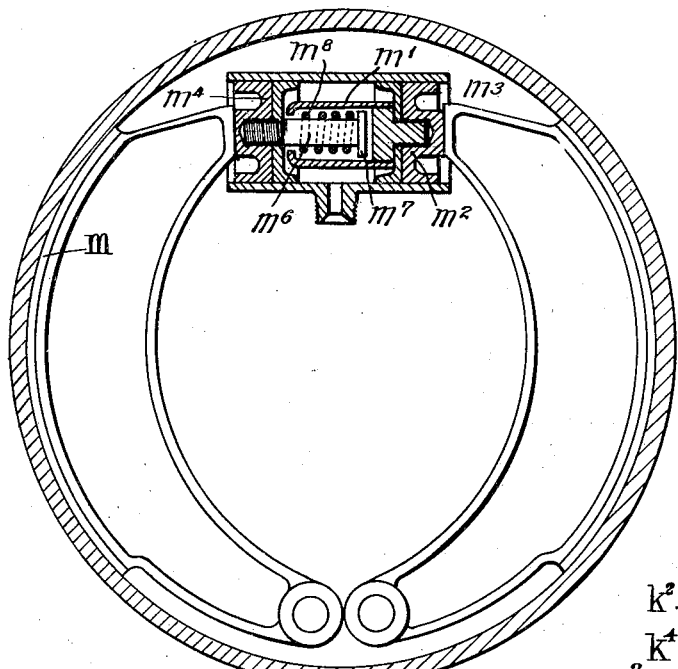
Figure 9 is a front view of an expanding brake.

As a modification of the foregoing a single cylinder may be employed for applying either a tension band to the exterior of a brake drum as in Figures 7 and 8 or expandible shoes to the interior thereof as in Figure 9.

In the former case the cylinder may be arranged by means of two movable pistons, one at each end of the cylinder, Figures 7 and 8, to push apart the ends of two levers $l$ pivotally mounted at equal distances from the centre of the brake drum and engaging at their opposite ends the two ends $l'$ of a brake band $l^2$ encircling the same. In this case the brakes for the fore end wheels will have the pistons *o* contacting directly with the levers *l* connected to the gripping members as shown in Figure 7 while the pistons *l*³, Figure 8, for the rear end wheel brakes will be connected to the gripping members through the intermediary of resilient devices *l*⁴.

Cylinders as last indicated but without the provision of intermediate levers may be mounted to operate directly between the ends of the two halves of an internal expanding brake *m* as shown in Figure 9, the fore end wheel brake cylinders being directly connected as shown in Figure 7 and the rear or aft end wheel brake cylinders being connected through resilient means such as *l*⁴ as before described in connection with Figure 8.

In arrangements operated by a single cylinder as last described, this may be formed as a plain tube *n* with a pipe connection *n'* at the middle and fitted with an outwardly moving piston *l*³ at each end; said pistons pressing either directly or through resilient devices upon the inner ends of two two-arm levers *l*, the outer ends of which are connected to the brake band *l*² in such a manner as to tension the same when the inner ends of the levers *l* are pushed out by the pistons. The outer ends of the levers are formed with an eye through which a screwed member *l'* attached to the end of the brake band *l*² projects and are provided with nuts *l*⁵ for tightening the same. These nuts *l*⁶ of the screwed members *l'* which are directed towards one another are each provided with a coiled spring *l*⁷ and the two springs find their abutments upon the arms of a central fixed element *l*⁸, one pressing upon one side and the other upon the other side. These springs are for the purpose of releasing the brake.

Having now described my invention what I claim as new and desire to secure by Letters Patent is:—

1. A vehicle wheel brake-applying gear having in combination cylinders having fluid-displacing means, means for actuating the same braking devices for wheels at the back and those at the front of the vehicle, a fluid-operated piston actuating a front wheel braking device, a piston actuating a like device for a back wheel, independent fluid transmission means connecting said plunger means with said pistons, and resilient means which are deformed by pressure above a predetermined amount for limiting the action of the piston actuating the braking device for the back wheel.

2. A vehicle wheel brake-applying gear having in combination two cylinders having fluid-displacing means, means for actuating the same braking devices for wheels at the front and for those at the back of the vehicle, a fluid-operated piston actuating the front wheel braking device, a piston actuating the device for a back wheel, a separate fluid column system connecting each plunger with a piston, and a resiliently loaded capacity vessel in the column system for the back wheel.

3. A system of hydraulic brake control comprising wheel braking devices at the front and at the rear of a vehicle, pressure cylinders with pistons for operating each device, a separate fluid column transmission to each cylinder, cylinders with means for applying pressure to each fluid column, means for jointly operating said plungers and resilient means in the part of the system for the back wheels which deflects at some predetermined pressure so that thereafter the proportion of the total force available for applying all the brakes which is exerted on the braking devices at the front exceeds that exerted on those at the back.

4. A system of hydraulic brake control comprising wheel braking devices at the front and at the rear of a vehicle, fluid-moved members for operating the same, separate pipe runs to each member, fluid-displacing means connected to each pipe run, means for jointly operating said displacing means, and resilient means acting after a predetermined pressure is reached to apportion the greatest share of the total force exerted for applying all the brakes to the front wheel braking devices during continued brake application.

5. A system of hydraulic brake control comprising fluid-operated wheel braking devices at the front of a vehicle, similarly operated devices at the rear thereof, a separate fluid column transmission to each device, means for applying pressure to each fluid column, means for jointly operating said pressure-applying means and resilient means in the part of the system for the back wheels which deflects at some predetermined pressure so that thereafter the proportion of the total force available for applying all the brakes which is exerted on the braking devices at the front exceeds that exerted on those at the back.

6. A system of hydraulic brake control comprising fluid-operated wheel braking devices at the front of a vehicle, similarly operated devices at the rear thereof, separate pipe runs to each of said devices, means for creating fluid pressure in each of said pipe runs, means for jointly operating said pressure-creating means, and means acting at a predetermined pressure to increase the capacity of the pipe run to the back wheels and thus limit the pressure therein during continued brake application.

7. A vehicle wheel brake-applying gear having in combination cylinders having fluid-displacing means, means for actuating the same, a fluid-operated piston for actuating a front wheel braking device, a piston for actuating a like device for a back wheel, independent fluid column systems connecting said plungers with said pistons, and a resilient capacity-increasing device in the system to the piston operating the braking device for the back wheel.

8. A vehicle wheel brake-applying gear having in combination cylinders having fluid-displacing means, means for actuating the same, a fluid-operated piston for actuating a front wheel braking device, a piston for actuating a like device for a back wheel, independent fluid column systems connecting said plungers with said pistons, and a chamber extensible by a predetermined pressure connected to the system for the piston operating the braking device for the back wheel.

9. A vehicle wheel brake-applying gear having in combination cylinders having fluid-displacing means, means for actuating the same, a fluid-operated piston for actuating a front wheel braking device, a piston for actuating a like device for a back wheel, independent fluid column systems connecting said plungers with said pistons, and a cylindrical chamber having a resiliently loaded piston fitted thereto connected to the system for the piston operating the braking device for the back wheel.

10. A system of hydraulic brake control comprising wheel braking devices at the front and at the rear of a vehicle, fluid-moved members for operating the same, separate pipe runs to each member, fluid-displacing means connected to each pipe run, means for jointly operating said displacing means, and a chamber extensible by a predetermined pressure connected to the pipe run for the member operating the rear wheel braking devices.

11. A system of hydraulic brake control comprising wheel braking devices at the front and at the rear of a vehicle, fluid-moved members for operating the same, separate pipe runs to each member, fluid-displacing means connected to each pipe run, means for jointly operating said displacing means, and a cylindrical chamber having a resiliently loaded piston fitted thereto connected to the pipe run for the member operating the rear wheel braking devices.

12. A vehicle wheel brake-applying gear having in combination two cylinders having fluid-displacing means, a pedal actuating the same, brake-applying devices for wheels at the front and for those at the back of the vehicle, a fluid-operated piston actuating a front wheel braking device, a similarly operated piston actuating a braking device for a back wheel, an independent fluid column system connecting each plunger with its piston, and a cylindrical chamber having a resiliently loaded piston fitted thereto connected to the system for the back wheels to minimize from some determined period of its movement the pressure on the piston actuating the braking device for the back wheel.

13. A system of hydraulic brake control, comprising means to which force is applied to put on the brakes, cylinders having fluid-displacing means operated thereby, independent hydraulic piping systems connecting said cylinders to actuating pistons, brake-applying devices for the wheels at opposite ends of the vehicle and variable capacity resiliently loaded chamber means provided in the piping to the back end for diminishing the proportion of the total force exerted for applying all the brakes which is transmitted to the brakes at that end of the vehicle.

14. A system of hydraulic brake control, comprising friction brake gripping devices at the front and at the rear of a vehicle, fluid-moved members for operating the same, separate pipe runs to each member, fluid-displacing means connected to each pipe run, means for jointly operating said displacing means and deflectable resilient means co-operating with a rear wheel brake device to maintain within a predetermined pressure the force transmitted to said rear brake device by its pipe run.

In testimony whereof I have signed my name to this specification.

JOHN VERNON PUGH.